US009528493B2

(12) United States Patent
Asheim et al.

(10) Patent No.: US 9,528,493 B2
(45) Date of Patent: Dec. 27, 2016

(54) APPARATUS TO DETECT AERODYNAMIC CONDITIONS OF BLADES OF WIND TURBINES

(71) Applicants: Michael J. Asheim, Golden, CO (US); Manjinder J Singh, Broomfield, CO (US); Johannes Gerhardes Wardjan Alberts, Aarhus (DK)

(72) Inventors: Michael J. Asheim, Golden, CO (US); Manjinder J Singh, Broomfield, CO (US); Johannes Gerhardes Wardjan Alberts, Aarhus (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 842 days.

(21) Appl. No.: 13/903,019

(22) Filed: May 28, 2013

(65) Prior Publication Data

US 2014/0356164 A1 Dec. 4, 2014

(51) Int. Cl.
*F03D 1/06* (2006.01)
*F03D 7/02* (2006.01)
(Continued)

(52) U.S. Cl.
CPC ............... *F03D 1/065* (2013.01); *F03D 3/062* (2013.01); *F03D 7/0224* (2013.01);
(Continued)

(58) Field of Classification Search
CPC .......... F03D 3/062; F03D 1/065; F03D 7/022; F03D 7/0224; F03D 7/0228; F03D 7/0296; F03D 7/048; F03D 11/0058; F03D 11/0091; F05B 2270/322; F05B 2270/321; F05B 2270/328; F05B 2270/333; F05B 2270/808; F05B 2270/81; F05B 2260/80; F05B 2260/96; F05B 2260/8211; F05B 2240/96; Y02E 10/722; Y02E 10/723
See application file for complete search history.

(56) References Cited

U.S. PATENT DOCUMENTS 3,881,056 A * 4/1975 Gibson ................. H04R 1/342
381/160
3,895,188 A * 7/1975 Ingraham ............... G10K 11/08
367/104
(Continued)

FOREIGN PATENT DOCUMENTS

EP 2075462 A2 7/2009
JP 2004293527 A * 10/2004
WO WO 2007089136 A2 * 8/2007 ........... F03D 7/0224

OTHER PUBLICATIONS

JP 2004293527, English Machine Translation, Translated by ProQuest Apr. 29, 2016.*

*Primary Examiner* — Gregory Anderson
*Assistant Examiner* — Wayne A Lambert

(57) ABSTRACT

Apparatus for detecting aerodynamic conditions of a rotor blade (22) of a wind turbine (10). An acoustic sensor (24) may be remotely located from the rotor blade. The sensor may be focused to monitor a portion of a blade path swept by the rotor blade to detect an aerodynamic condition such as flow separation, and may provide input to a controller (27) for control of a pitch of the blade effective to prevent the flow separation from developing into a full stall condition. One sensor may be focused to monitor blades of more than one wind turbine. A plurality of such sensors in a wind park may be connected to a supervisory controller (120) to predict the propagation of wind conditions progressing through the park.

20 Claims, 3 Drawing Sheets

(51) Int. Cl.
*F03D 7/04* (2006.01)
*F03D 3/06* (2006.01)

(52) U.S. Cl.
CPC .......... *F03D 7/0256* (2013.01); *F03D 7/048* (2013.01); *F03D 17/00* (2016.05); *F03D 80/82* (2016.05); *F05B 2240/96* (2013.01); *F05B 2260/80* (2013.01); *F05B 2260/8211* (2013.01); *F05B 2270/322* (2013.01); *F05B 2270/333* (2013.01); *F05B 2270/81* (2013.01); *Y02E 10/722* (2013.01); *Y02E 10/723* (2013.01)

(56) References Cited

U.S. PATENT DOCUMENTS

| | | | | |
|---|---|---|---|---|
| 5,548,656 A * | 8/1996 | Weisel | ................ | H04R 29/001 381/122 |
| 6,498,859 B2 * | 12/2002 | Kuerti | ................ | H04R 3/002 381/361 |
| 6,619,918 B1 * | 9/2003 | Rebsdorf | ................ | F03D 7/0224 416/1 |
| 6,688,841 B1 * | 2/2004 | Wobben | ................ | F03D 7/0224 415/1 |
| 7,400,054 B2 * | 7/2008 | Wesselink | ................ | F03D 17/00 290/44 |
| 7,487,673 B2 * | 2/2009 | Ormel | ................ | F03D 80/40 416/39 |
| 7,896,614 B2 | 3/2011 | Fisher | | |
| 8,035,241 B2 * | 10/2011 | Subramanian | ................ | F03D 7/048 290/44 |
| 8,277,185 B2 | 10/2012 | Menke | | |
| 2004/0057828 A1 * | 3/2004 | Bosche | ................ | F03D 7/0204 416/1 |
| 2004/0258521 A1 | 12/2004 | Wobben | | |
| 2006/0018752 A1 * | 1/2006 | LeMieux | ................ | F01D 11/00 416/96 R |
| 2007/0031237 A1 * | 2/2007 | Bonnet | ................ | F03D 7/048 415/1 |
| 2007/0124025 A1 * | 5/2007 | Schram | ................ | F03D 7/0224 700/287 |
| 2007/0183607 A1 | 8/2007 | Andrews et al. | | |
| 2008/0069692 A1 * | 3/2008 | Oohara | ................ | F03D 7/0224 416/31 |
| 2009/0311097 A1 * | 12/2009 | Pierce | ................ | F03D 7/0224 416/42 |
| 2010/0098541 A1 * | 4/2010 | Benito | ................ | F03D 7/0224 416/36 |
| 2010/0101328 A1 | 4/2010 | Enevoldsen et al. | | |
| 2010/0284787 A1 * | 11/2010 | Petersen | ................ | F03D 7/024 415/119 |
| 2011/0140419 A1 * | 6/2011 | Stockner | ................ | H02K 7/1838 290/44 |
| 2012/0027591 A1 * | 2/2012 | Kinzie | ................ | F03D 7/0296 416/1 |
| 2012/0027592 A1 * | 2/2012 | Kinzie | ................ | F03D 1/0608 416/1 |
| 2012/0207589 A1 * | 8/2012 | Fridthjof | ................ | F03D 11/0091 415/121.3 |
| 2013/0149145 A1 * | 6/2013 | Shibata | ................ | F03D 11/0025 416/1 |
| 2015/0118047 A1 * | 4/2015 | Yoon | ................ | F03D 11/0091 416/1 |

* cited by examiner

APPARATUS TO DETECT AERODYNAMIC CONDITIONS OF BLADES OF WIND TURBINES

FIELD OF THE INVENTION

The present invention is related to wind turbines for generating electric power, and more particularly, to an apparatus to detect an aerodynamic condition such as a flow separation condition in blades of wind turbines.

BACKGROUND OF THE INVENTION

Renewable energy has become a major focus for energy and environment sustainability. Wind is an example of an appropriate energy source for utility-level power generation. The power generation for wind turbines may be substantially affected by the aerodynamic characteristics of wind-turbine interaction. For example, the amount of power extracted from the wind may in part depend on the aerodynamic angle of attack between the rotor blades and the incoming air flow. If, for a given wind speed, a certain maximum angle of attack is exceeded, the air flow can separate at the surface of the rotor blades and vortices may form. This effect is known as flow separation and limits the aerodynamic efficiency of the blades to extract power from the wind. This may substantially increase acoustic noise generated by the wind turbine.

Certain vibration-sensing devices for sensing such a condition have generally been installed into the blades and, as a result, their reliability tends to suffer due to the forces experienced by a rotating object. Other listening devices, which may be located outside the blade, may be subject to acoustic interference and/or may lack the ability to quickly and precisely detect where and when a flow separation condition may be initiated. For example, a flow separation condition may initially develop just in a portion of a blade path swept by a given blade. At least in view of the foregoing considerations, it would be desirable to provide a reliable and cost-effective apparatus for improved detection of such aerodynamic conditions.

BRIEF DESCRIPTION OF THE DRAWINGS

The invention is explained in the following description in view of the drawings that show.

DETAILED DESCRIPTION OF THE INVENTION

In the following detailed description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, to avoid pedantic and unnecessary description well known methods, procedures, and components have not been described in detail.

Furthermore, various operations may be described as multiple discrete steps performed in a manner that is helpful for understanding embodiments of the present invention. However, the order of description should not be construed as to imply that these operations need be performed in the order they are presented, nor that they are even order dependent. Repeated usage of the phrase "in one embodiment" does not necessarily refer to the same embodiment, although it may. Lastly, the terms "comprising", "including", "having", and the like, as used in the present application, are intended to be synonymous unless otherwise indicated.

Figure 1:
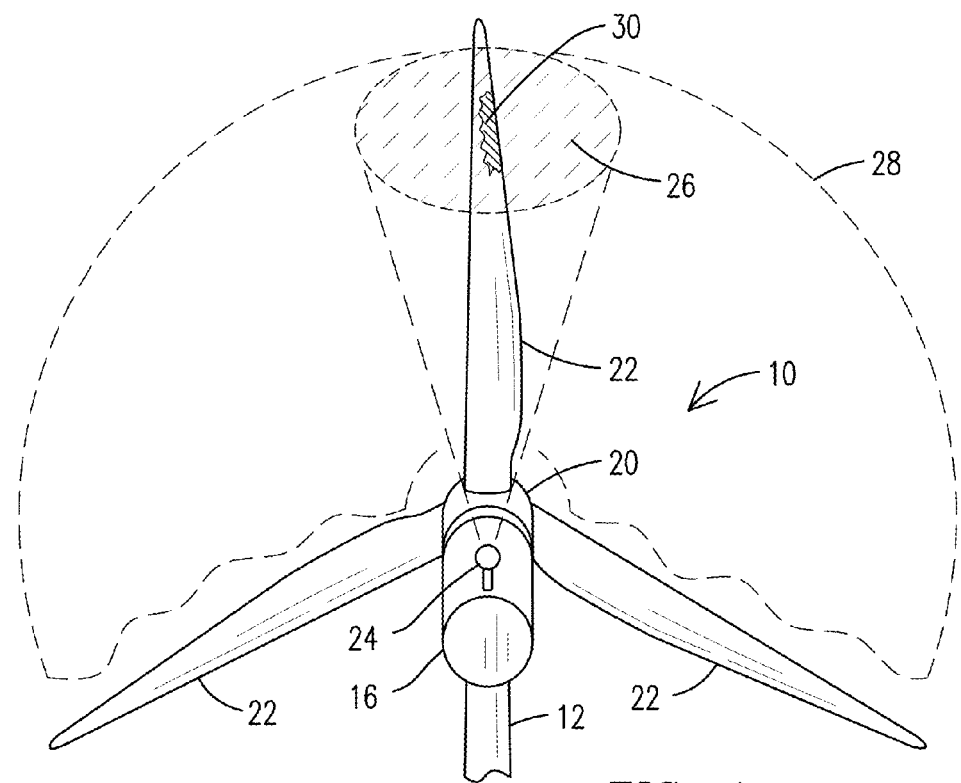
FIG. 1 is a schematic representation of a wind turbine, including an example elevation isometric view of an example listening-field of an acoustic sensor as may be focused to detect an aerodynamic condition, such as a flow separation condition, as may affect one or more of the blades of the wind turbine.

FIG. 1 is a schematic representation of one example embodiment of a wind turbine 10, as may benefit from aspects of the present invention. Wind turbine 10 may include a tower 12, a nacelle 16 coupled to tower 12, and a rotor 18 (FIG. 2) coupled to nacelle 16. Rotor 18 includes a rotatable hub 20 and a plurality of rotor blades 22 coupled to hub 20. In this example embodiment, rotor 18 has three rotor blades 22. It will be appreciated, however, that rotor 18 may have any number of rotor blades 22 that enables wind turbine 10 to function as described herein.

In one example embodiment, at least one acoustic sensor 24 may be remotely located from blade 22, such as on nacelle 16. Acoustic sensor 24 may be focused to monitor a portion 26 of a blade path 28 swept by rotor blades 22 to detect an aerodynamic condition, such as a flow separation condition, (schematically represented by a darkened area 30) affecting the blade in the portion of the blade path being monitored. This may allow acoustic sensor 24 to be focused on a radially outer portion of the blade path, particularly in the upper half of the blade path sweep, where the flow separation (e.g., incipient stall) may be expected to initiate, as may be historically and/or experimentally learned. In one example embodiment, a controller 27 (FIG. 2) is responsive to acoustic sensor 24 to adjust a pitch angle of the rotor blade at least over the portion of the blade path affected by the flow separation condition to adjust the blade angle to prevent the flow separation from progressing to a full stall condition.

Figure 2:
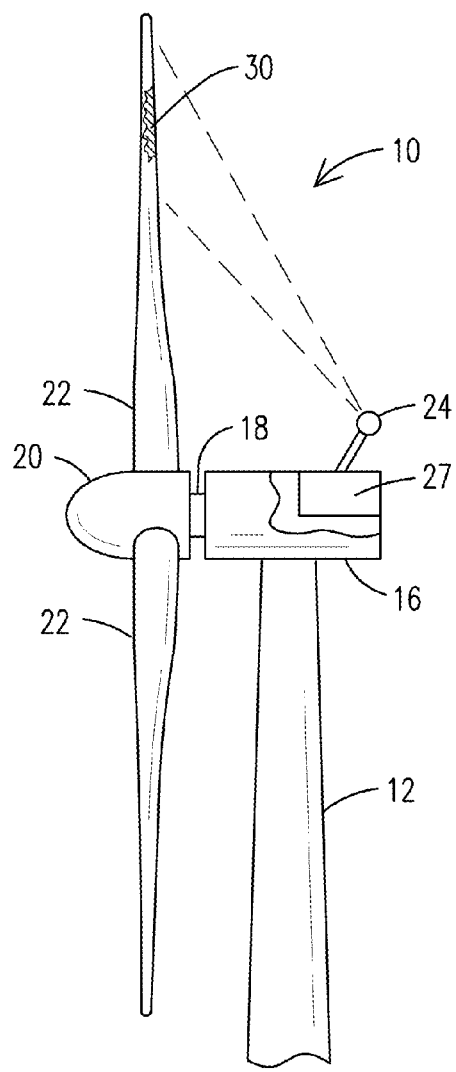
FIG. 2 is a schematic representation of a wind turbine, including an example side view of an example listening-field of an acoustic sensor embodying aspects of the present invention.
Figure 3:
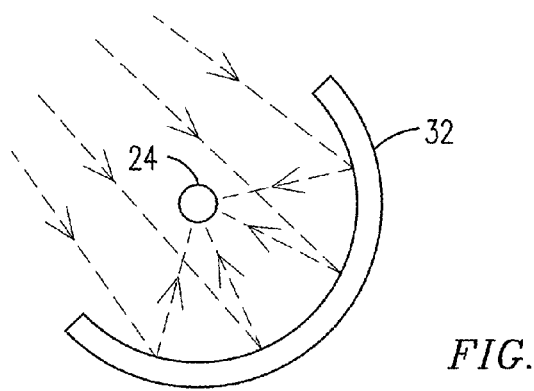
FIG. 3 is a schematic of an example embodiment of an acoustic sensor embodying aspects of the present invention, such as may include an acoustic condenser coupled to the acoustic sensor.

In one example embodiment, acoustic sensor 24 may be a microphone, such as a unidirectional microphone, as schematically represented in FIG. 2. For example, the sensitivity of such a microphone may have a pattern (listening-field) configured to listen to sounds emanating from the portion of the blade path where a blade is likely to experience the flow separation condition, while attenuating sounds outside the portion of the blade path being monitored. As illustrated in FIG. 3, an acoustic condenser 32 (e.g., a parabolic dish) may be coupled to acoustic sensor 24, as may provide a relatively higher signal-to-noise ratio to listen to sounds emanating from the portion of the blade path where a blade is likely to experience the flow separation condition.

Figure 4:
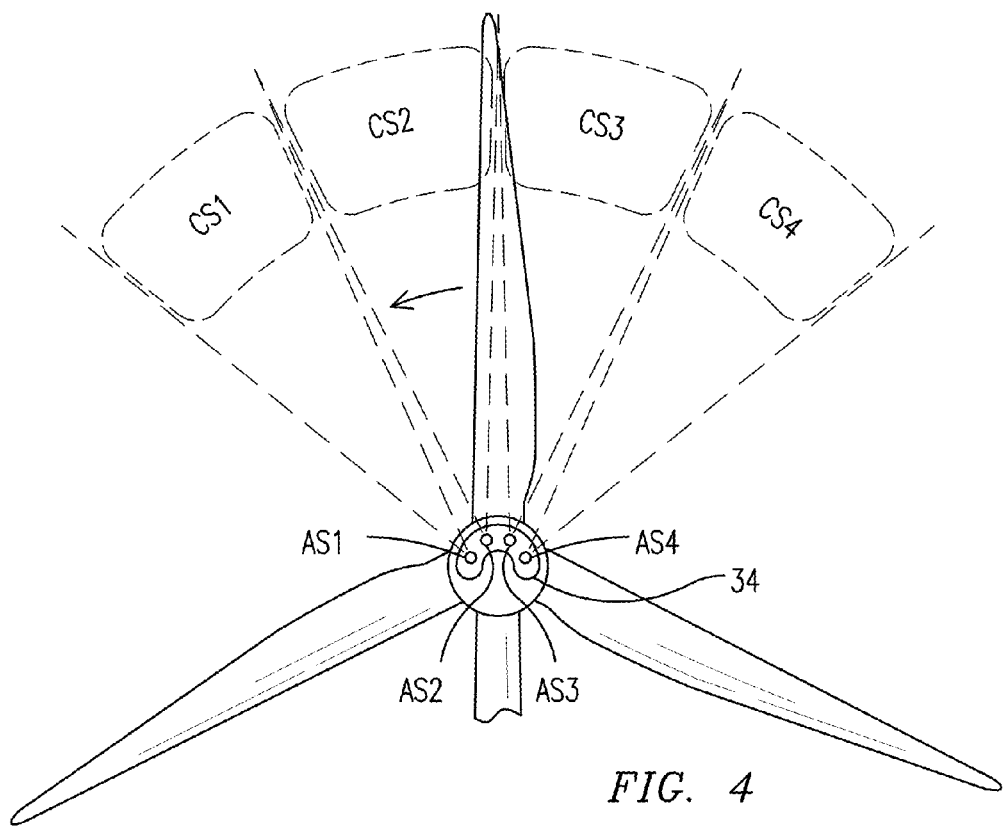
FIG. 4 is a schematic of one example embodiment of an acoustic sensor embodying aspects of the present invention, such as may comprise an array of acoustic sensors.

In one example embodiment, as may be seen in FIG. 4, acoustic sensor may comprise an array 34 of acoustic sensors, e.g., acoustic sensors AS1-AS4 to detect the aerodynamic condition affecting a given blade in one or more circumferential sectors, e.g., circumferential sectors labeled CS1-CS4 of the blade path swept by the blade. For example, a first acoustic sensor AS1 may be focused onto a first circumferential sector CS1, a second acoustic sensor AS2 may be focused onto a second circumferential sector CS2, and so on and so forth. Thus it will be appreciated that an apparatus embodying aspects of the present invention can offer substantial flexibility (e.g., a relatively high-level of acoustic granularity) to detect when and where a flow separation condition may be initiated so that appropriate corrective action (e.g., localized pitch angle adjustment) may be promptly taken by controller 27 (FIG. 2) to remove the flow separation condition and, for example, prevent spread of the condition which could lead to a stall of the blade, as may involve massive separation of the air flow.

In one example embodiment, the array 34 of acoustic sensors may comprise electronically-steerable acoustic sensors, which may be dynamically focused to the portion of the blade path where the aerodynamic condition may affect a given blade. For example, if a certain one of circumferential sector of sectors CS1-CS4 is the portion of the blade path where the aerodynamic condition may be affecting a given blade, (e.g., causing a relatively high-level of noise) such an array of electronically-steerable acoustic sensors would be able to dynamically locate such circumferential sector to detect the aerodynamic condition.

Figure 5:
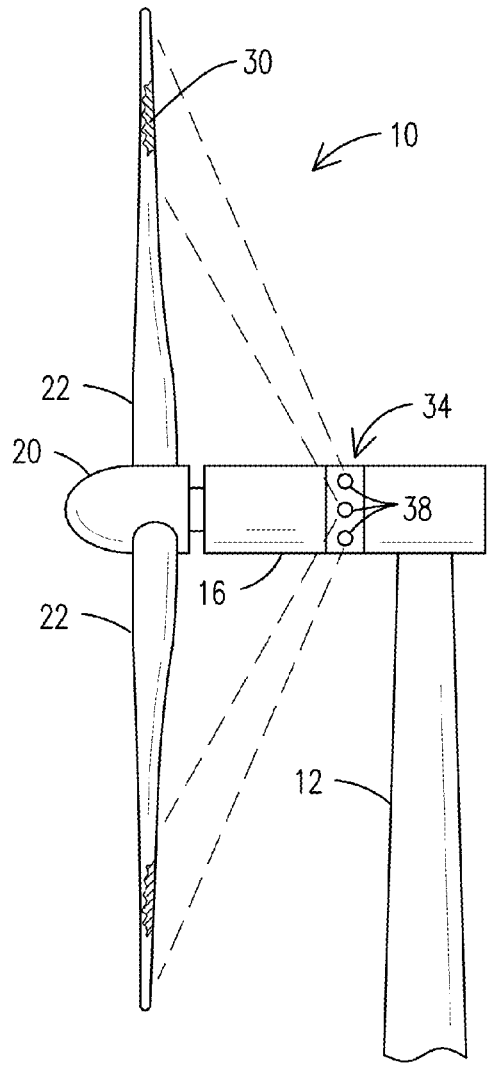
FIG. 5 is a schematic of another example embodiment of an array of acoustic sensors as may be disposed about a nacelle of the wind turbine in accordance with aspects of the present invention.

In one example embodiment, as shown in FIG. 5, an array 34 of acoustic sensors 38 may be disposed about a perimeter of nacelle 16 of the wind turbine. This may allow listening to sounds which can emanate practically from anywhere along an entire circumferential sector of the blade path swept by the blades. It should be appreciated that the array shapes and/or the number of sensors per array, as may be illustrated in the figures, should be construed in an example sense and not in a limiting sense being that the array shapes and/or the number of sensors may be readily tailored based on the requirements of a given application.

Figure 6:
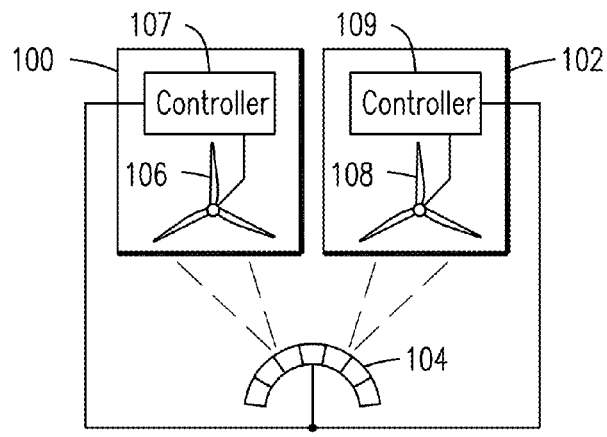
FIG. 6 is a schematic representation of one example embodiment illustrating two neighboring wind turbines, as each may be monitored by one or more sensor arrays to detect the flow separation condition.

FIG. 6 is a schematic representation of one example embodiment illustrating two neighboring wind turbines 100, 102. In this example embodiment, at least one acoustic sensor array 104 may be remotely located (e.g., ground-based) from the respective rotor blades 106, 108 of wind turbines 100, 102. In this example embodiment, one or more sensor arrays 104 may be focused to monitor respective portions of the blade paths swept by the respective rotor blades 106, 108 of wind turbines 100, 102. For example, such sensor arrays may be geometrically arranged to maximize sound detection relative to wind turbines 100, 102 notwithstanding yaw rotation which may be experienced by wind turbines 100, 102. This may allow a common sensor array 104 to detect an aerodynamic condition (e.g., flow separation condition), as may affect blades 106, 108 of neighboring turbines 100, 102. Each wind turbine may include a respective controller 107, 109 responsive to sensor array 114 to, for example, adjust the pitch angle of a rotor blade being affected by the flow separation condition.

Figure 7:
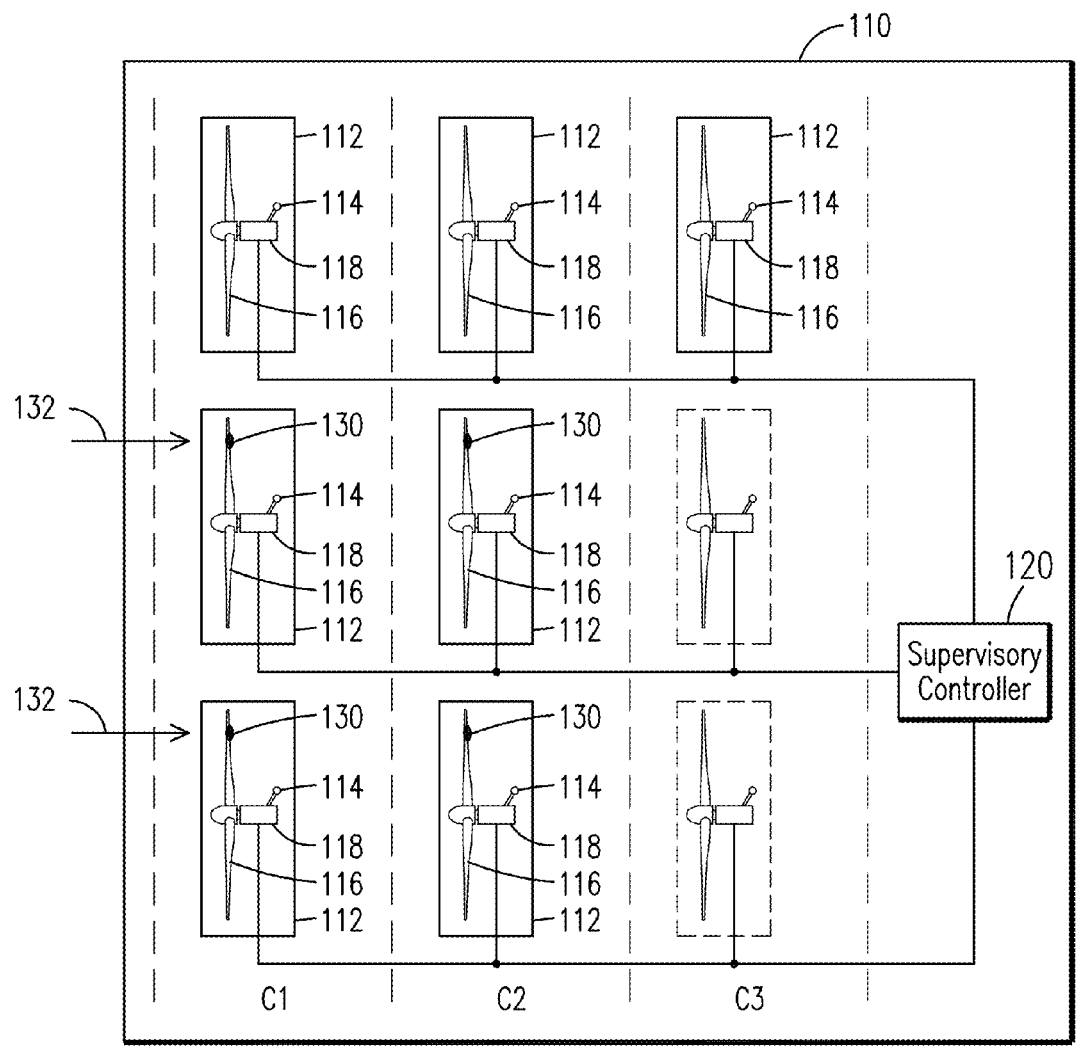
FIG. 7 is a schematic representation illustrating a top-view of a wind park comprising a plurality of wind turbines embodying aspects of the present invention.

FIG. 7 is a schematic illustrating a top-view representation of an example wind park 110 comprising a plurality of wind turbines 112 embodying aspects of the present invention. Each wind turbine may include an acoustic sensor 114 focused to detect an aerodynamic condition, such as a flow separation condition affecting one or more blades 116, as described above. Each wind turbine may further include a controller 118 responsive to a respective acoustic sensor 114, for example, to adjust a respective pitch angle of blades 116 of a respective turbine. Each wind turbine may be coupled to a supervisory controller 120, which is responsive to detected aerodynamic conditions affecting respective rotor blades of at least some of the plurality of wind turbines 112. In one example embodiment, supervisory controller 120 may be configured to estimate atmospheric conditions likely to propagate through the park, and predict aerodynamic conditions likely to affect respective rotor blades of at least some other ones of the plurality of wind turbines 112. For example, presuming at time T1, some wind turbines 112 located on column C1 of the wind park experience a flow separation condition (schematically represented by solid dots 130) in response to atmospheric conditions (e.g., wind speed, gradients, etc. (represented by arrows 132)), and further presuming at a subsequent time T2 some of wind turbines 112 located on column C2 downstream from the affected wind turbines on column C1 also experience the flow separation condition (similarly represented by solid dots 130), then supervisory controller may predict flow separation conditions for turbines 112 (drawn with dashed lines) on column C3, which are located downstream relative to the affected wind turbines on columns C1 and C2.

It will be appreciated that aspects of an example inventive apparatus—as may be used to monitor a portion of a blade path swept by a rotor blade to detect an aerodynamic condition affecting the blade in the portion of the blade path being monitored—and methods disclosed herein may be implemented by any appropriate processor apparatus using any appropriate programming language or programming technique. The apparatus can take the form of any appropriate circuitry, such as may involve a hardware embodiment, a software embodiment or an embodiment comprising both hardware and software elements. In one embodiment, the apparatus may be implemented by way of software and hardware (e.g., processor, sensors, etc.), which may include but is not limited to firmware, resident software, microcode, etc. Furthermore, parts of the processor apparatus can take the form of a computer program product accessible from a processor-usable or processor-readable medium providing program code for use by or in connection with a processor or any instruction execution system. Examples of processor-readable media may include non-transitory tangible processor-readable media, such as a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-RAN) and DVD. An interface display may be a tablet, flat panel display, PDA, or the like.

In one example embodiment, a processing system suitable for storing and/or executing program code may include in one example at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the apparatus either directly or through intervening I/O controllers. Network adapters may also be coupled to the apparatus to enable the data processing system to become coupled to other data processing systems or remote printers or storage devices through intervening private or public networks. Modems, cable modem and Ethernet cards are just a few of the currently available types of network adapters.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. Apparatus comprising:
   a wind turbine having at least one rotor blade; and
   at least one acoustic sensor remotely located from the at least one rotor blade, said at least one acoustic sensor focused to monitor a portion of a blade path comprising a circumferential sector on a radially outer portion of the blade path swept by said at least one rotor blade to detect an aerodynamic condition affecting the blade in the portion of the blade path being monitored, wherein said at least one acoustic sensor has a listening-field configured to listen to sounds emanating from the circumferential sector over the radially outer portion of the blade path being monitored, while attenuating sounds emanating outside the circumferential sector on the radially outer portion of the blade path being monitored.

2. The apparatus of claim 1, wherein said at least one acoustic sensor comprises a unidirectional acoustic sensor.

3. The apparatus of claim 1, further comprising an acoustic condenser coupled to said at least one acoustic sensor.

4. The apparatus of claim 1, wherein said at least one acoustic sensor comprises a further acoustic sensor focused to monitor a different portion of the blade path swept by said at least one rotor blade to detect an aerodynamic condition affecting the blade in at least the different portion of the blade path.

5. The apparatus of claim 1, wherein said at least one acoustic sensor comprises an array of acoustic sensors.

6. The apparatus of claim 5, wherein the array of acoustic sensors is disposed about a perimeter of a nacelle of the wind turbine to detect an aerodynamic condition affecting the blade in at least one of a plurality of circumferential sectors of the blade path swept by the at least one rotor blade.

7. The apparatus of claim 6, wherein each of the acoustic sensors in the array is respectively focused towards at least one of the plurality of circumferential sectors of the blade path swept by said at least one rotor blade.

8. The apparatus of claim 1, wherein said at least one acoustic sensor comprises an array of electronically-steerable acoustic sensors.

9. The apparatus of claim 8, wherein the array of electronically-steerable acoustic sensors is dynamically focused to the portion of the blade path to detect the aerodynamic condition.

10. A wind park comprising a plurality of wind turbines as recited in claim 1, and further comprising a supervisory controller responsive to detected aerodynamic conditions affecting respective rotor blades of at least some of the plurality of wind turbines, the supervisory controller configured to estimate atmospheric conditions likely to propagate through the park, and to predict aerodynamic conditions likely to affect respective rotor blades of at least some other ones of the plurality of wind turbines.

11. The apparatus of claim 1, wherein said at least one acoustic sensor is focused to monitor a radially outer portion of the blade path effective to detect a flow separation condition.

12. The apparatus of claim 11, further comprising a controller responsive to said at least one acoustic sensor to adjust a pitch angle of said at least one rotor blade to prevent the flow separation condition from progressing to a stall condition.

13. Apparatus comprising:
    at least two wind turbines each having at least one respective rotor blade; and
    at least one acoustic sensor array remotely located from the respective rotor blades of said at least two wind turbines, said at least one acoustic sensor array focused to monitor respective portions comprising respective circumferential sectors on radially outer portions of the blade paths swept by the respective rotor blades of the at least two wind turbines, the monitored portions of the respective blade paths effective to detect an aerodynamic condition affecting at least one blade in at least one of the respective portions of the blade paths swept by the respective rotor blades of said at least two wind turbines, wherein said at least one acoustic sensor array has a listening-field configured to listen to sounds emanating from the respective circumferential sectors on the radially outer portions of the blade paths being monitored, while attenuating sounds outside the respective circumferential sectors on the radially outer portions of the blade paths being monitored.

14. The apparatus of claim 13, wherein said at least one acoustic sensor comprises an array of electronically-steerable acoustic sensors.

15. Apparatus for a wind turbine having at least one rotor blade comprising:
    at least one acoustic sensor remotely located from the at least one rotor blade, said at least one acoustic sensor focused to monitor a portion comprising a circumferential sector on a radially outer portion of a blade path swept by said at least one rotor blade to detect an aerodynamic condition affecting the blade in the portion of the blade path being monitored, wherein said at least one acoustic sensor has a listening configured to listen to sounds emanating from the circumferential sector on the radially outer portion of the blade path being monitored, while attenuating sounds emanating outside the circumferential sector on the radially outer portion of the blade path being monitored.

16. The apparatus of claim 15, wherein said at least one acoustic sensor is focused to monitor a radially outer portion of the blade path effective to detect an incipient stall condition.

17. The apparatus of claim 15, wherein said at least one acoustic sensor comprises an array of acoustic sensors.

18. The apparatus of claim 17, wherein the array of acoustic sensors is disposed about a perimeter of a nacelle of the wind turbine to detect an aerodynamic condition affecting the blade in at least one of a plurality of circumferential sectors of the blade path swept by the at least one rotor blade.

19. The apparatus of claim 15, wherein said at least one acoustic sensor comprises an array of electronically-steerable acoustic sensors which is dynamically focused to the portion of the blade path to detect the aerodynamic condition.

20. The apparatus of claim 15, further comprising a supervisory controller in a wind park responsive to detected aerodynamic conditions affecting respective rotor blades of at least some of a plurality of wind turbines in the wind park, the supervisory controller configured to estimate atmospheric conditions likely to propagate through the park over a time horizon, and to predict aerodynamic conditions likely to affect over the time horizon respective rotor blades of at least some other ones of the plurality of wind turbines.

\* \* \* \* \*